United States Patent [19]  [11] Patent Number: 5,875,345
Naito et al.  [45] Date of Patent: Feb. 23, 1999

[54] INFORMATION PROCESSING SYSTEM HAVING DUAL POWER SAVING MODES

[75] Inventors: Arimasa Naito, Fujisawa; Takahide Wada, Yokohama, both of Japan

[73] Assignee: International Business Machines Corporation, Armonk, N.Y.

[21] Appl. No.: 673,412

[22] Filed: Jun. 28, 1996

[30] Foreign Application Priority Data

Jul. 5, 1995 [JP] Japan ................................. 7-169797

[51] Int. Cl.[6] .................................................. G06F 1/32
[52] U.S. Cl. ............................ 395/750.05; 395/750.01; 395/188.01
[58] Field of Search ................. 395/750.05, 750.06, 395/750.01, 750.03, 186, 188.01, 750.04, 750.08; 364/492

[56] References Cited

U.S. PATENT DOCUMENTS

| 4,907,150 | 3/1990 | Arroyo et al. | 395/182.22 |
| 5,435,005 | 7/1995 | Saito | 395/575 |
| 5,548,763 | 8/1996 | Combs et al. | 395/750.01 |

FOREIGN PATENT DOCUMENTS

| 0394834 | 10/1990 | European Pat. Off. | G06F 1/00 |
| 0488384 | 6/1992 | European Pat. Off. | G06F 1/32 |

OTHER PUBLICATIONS

IBM Technical Diclosure Bulletin, vol. 32, No. 3A, Aug. 1989, *Hardware Monitor Security Feature*.

*Primary Examiner*—Ayaz R. Sheikh
*Assistant Examiner*—Ario Etienne
*Attorney, Agent, or Firm*—Felsman, Bradley, Gunter & Dillon; Anthony N. Magistrale

[57] ABSTRACT

Disclosed is an information processing system that can operate in at least two modes of power management, a normal mode and a suspend mode. The system can enter the suspend mode in response to the expiration of an inactivity suspend timer and can resume therefrom in response to a resume request. While resuming, the system is operative to measure an elapsed time between entering the suspend mode and resuming therefrom. The system is further operative during the resume to either (1) prompt a user to enter a password if the elapsed time is longer than a predetermined time or (2) skip (1) and not prompt a user to enter a password if the elapsed time is shorter than the predetermined time. The system decreases the amount of time required to resume from a power saving mode by not requiring a password input when a resume request by a user, such as key input, occurs within a relatively short period of time after the system entered the suspend mode.

7 Claims, 4 Drawing Sheets

INFORMATION PROCESSING SYSTEM HAVING DUAL POWER SAVING MODES

BACKGROUND OF THE INVENTION

1. Field of the Invention

The present invention relates to an information processing system, such as a personal computer, and a control method therefor and in particular to an information processing system that has a power management function for reducing, as needed, the power supply to electric circuits that enter a low activity state, or for halting the power supply to them, and to a control method therefor. More specifically, the present invention pertains to an information processing system that provides both security (protection for secret data) and useability (operability) during a power saving operation, and to a control method therefor.

2. Description of the Related Art

As progress in the current technique continues, various types of personal computers (hereafter referred to as "PCS" or "systems"), such as desktop and notebook computers, are being manufactured and sold. The notebook PCS are being manufactured compact and light, since portability and outdoor use are taken into consideration. Almost all the notebook PCS, including those sold by IBM have "a structure with a cover" that comprises a body, which incorporates a system board and peripheral devices and has a keyboard on its top face, and a cover that has an LCD panel provided substantially at the center of the internal face. The cover is so hinged with the body at the rear edge as to be rotatable. A user opens the cover to use the PC and closes it when the PC is not in use or is to be carried.

One of the features of notebook PCS is that they are battery operated. Accordingly, they can be used at sites where there are no commercially available power sources. A battery that is used in a notebook PC is commonly formed as a "battery pack" which is a package that is comprised of a plurality of rechargeable battery cells, such as Ni-Cd, NiMH or Li-Ion. Although such a battery pack is reusable by being recharged, the charge capacity is sufficient to last only for two to three hours for the system operation time. Another feature of notebook PCS is that various ideas for power saving are taken to extend the duration of a battery pack.

Power saving in a PC can be realized not only by reducing the power consumption by the individual electric circuits, but also by halting, as needed, the power supply to electric circuits (or peripheral devices) that fall into low activity states. The latter method can be called "power management". The power management modes for the PC are modes which halt the power supply to individual devices, such as the back light of a Liquid Crystal Display (LCD) and a Hard Disk Drive (HDD) that account for the greatest share of the total power consumption by a full system. These modes are also called an "LCD back light-off" mode and an "HDD-off" mode respectively.

Another type of power management mode is a "Suspend" mode in which the power supply to all the electric circuits, except for a main memory, is halted. The power management is triggered by the expiration of a predetermined time (a time out value that is set for the suspend timer) since a last user input or a last system operation (e.g., a disk access of the HDD). The system may enter power management modes in response to an instruction by a user, such as the depression of a predetermined function key (a suspend key). In a power management mode, such as the suspend mode, when key/mouse input is again effected by a user, or when a system operation is restarted, the power supply is resumed and a suspended task is begun again at a point just before the transition to the power management mode. For example, ThinkPads 700/750/755 (a trademark of IBM Corp.) that are sold by IBM have a suspend function.

At present, from an ecological view point, the demand for power management is increasing, even for desktop PCS to which power can be supplied almost unlimitedly by commercially available power sources. In June 1993, the U.S. Environmental Protection Agency (EPA) advocated a self-control action that is called the "Energy Star Computer Program", and required that consumed power in the standby state be a predetermined value or lower (drive power is to be less than 30 W, or 30% or less than that when the CPU is active). Computer makers have developed and manufactured products that conform to the advocated action. For example, PS/55E (for which "Green PC" is a common name) that is sold by IBM has a suspend function. The IBM PC 750 and Aptiva (a trademark of IBM Corp.) series incorporate a FAX function, and also have a rapid resume function, which correspond to hibernation for the purpose of saving power consumption during the course of the standby state until receiving data.

On the other hand, as the times have been changing, security in the office has become important. Various locking mechanisms have been proposed and implemented into products in order to protect PC bodies and expensive expansion devices (e.g., HDD packages and PC cards) from being stolen. A mechanism for inhibiting the removal of an HDD is disclosed in, for example, Japanese Patent Application No. Hei 04-246292 (Japanese Unexamined Patent Publication No. Hei 06-119082: Our company reference No. JA9-92-030), which was assigned to the present applicant. A mechanism for inhibiting the removal of a PC card from a PC card slot is disclosed in, for example, Japanese Patent Application No. Hei 05-182972 (Japanese Unexamined Patent Publication No. Hei 07-44269: Our company reference No. JA9-93-030).

As for security, not only physical theft but also theft at the software level such as the invasion (data access) of a system by an unauthorized user must be taken into consideration. To maintain security while an authorized user is absent from the system there is a computer of the type that prompts a user to input a password when the system is powered on (during the course of executing a power on self test (POST) program). When a user is absent from the front of the PC, the system is not only being powered down but also falls into a power management mode such as the suspend mode. It is because a predetermined time, that may be set by the suspend timer, will sometimes elapse while a user is absent from the front of the PC. Therefore, the number of computers have increased that prompt a user to input a password (also called a "resume password", which may be the same password as that of power-on password) even when resuming from the suspend mode. Many of the recent PCS sold by IBM have a resume password function.

"Suspend" more specifically means a function for halting the power supply to all the electric circuits, except for a main memory in which are stored data (hardware context data, such as the I/O setup state, the status of a CPU and the contents of a VRAM) that are required for the resumption of a task. The recovery operation from the suspend mode is performed substantially in an inverse sequence by restarting the power supply to the individual electric circuits and restoring the saved data to its original locations. As a result, a suspended task can be begun at a point just before the mode transition. The recovery from the suspend mode is called "Resume". A trigger for entering the suspend mode may be the selection of a suspend icon (by double clicking on it), the closing of the cover (the LCD panel) of a notebook PC, or some other operation, in addition to the depression of a suspend key (previously described).

It is obvious that, as the time out value of the suspend timer is determined to be shorter, the effect of the power saving is increased because the system enters the suspend mode earlier. Once the system enters the suspend mode, the system prompts a user to input a password. The password prompt function may be necessary for protecting the security of the system. However, such password input operation may sometimes be troublesome for a user.

When the transition to the suspend mode has occurred upon the request by a user (for example, depression of a suspend key), it can be assumed that the user agrees with the password input operation in recovering from the suspend mode. However, in a case where the mode transition is caused by the suspend timer, the password input operation may be irritating to the user. It is because the system enters the suspend mode while the user is simply relaxing and resting from a job (or when the user is thinking, has halted data input operations by being engaged in a sudden telephone conversation, or is talking to another person while sitting in front of the PC). When a system enters the suspend mode against a user's will, he tends to request to resume from the suspend mode because he is irritated by the mode transition. And when immediately thereafter the user is confronted with a demand that a password shall be entered, the user becomes even more exasperated. In other words, the useability of the PC is deteriorated. The easiest method to resolve the problem of useability is to obviate the password input operation when resuming from the suspend mode. It takes about 5 seconds to restore the data that was stored in the main memory to the original locations. So, if a password input operation is eliminated, the resuming operation can be completed in a moment and the task can be instantaneously recovered. It is, however, improbable that the requirement for the input of a password will be removed under the present conditions where the need for improved system security is constantly stressed. The irritation that a user feels when the system suddenly enters the suspend mode and is then prompted to input a password may be eliminated by setting the time out value of the suspend timer to be a relatively greater value. It is because the system under the greater time out value never enters the suspend mode unless it is surely presumed that a user has removed from the PC. However, in such a case, the power saving effect is considerably reduced because the system enters the suspend mode after a long period of inactivity. That is, in order to obtain a greater power management effect for a PC, a trade-off between useability and security is sometimes required.

SUMMARY OF THE INVENTION

According to a first aspect of the present invention, an information processing system of the type which enters a power saving mode (e.g., suspend mode) when a predetermined time has elapsed since a last system operation, is characterized in that the system, when it resumes from the power saving mode, determines whether or not to prompt a password input in accordance with the time period elapsed following the transition to the power saving mode.

According to a second aspect of the present invention, an information processing system of the type which enters a power saving mode when a first predetermined time has elapsed since a last system operation, is characterized in that the system (1) prompts a password input when it resumes from the power saving mode after a second predetermined time has elapsed or (2) doesn't prompt a password input when it resumes from the power saving mode within the second predetermined time.

According to a third aspect of the present invention, a control method for an information processing system of the type which enters a power saving mode when a predetermined time has elapsed since a last system operation, is characterized in that the method includes a step of determining whether or not to prompt a password input in accordance with a time period elapsed following the transition to the power saving mode when the system resumes from the power saving mode.

According to a fourth aspect of the present invention, a control method for an information processing system of the type which enters a power saving mode when a first predetermined time has elapsed since a last system operation, is characterized in that the method inlcudes a step of (1) prompting a password input when the system resumes from the power saving mode after a second predetermined time has elapsed or (2) not prompting a password input when the system resumes from the power saving mode within the second predetermined time.

The second predetermined time is a reference period of time for determining whether or not a password input should be requested before recovering the task, and is called a "security time". The security time may be either a default value which is predetermined in advance at the time of manufacturing or shipping, or a user programmable value which can be altered afterwards.

According to the information processing system and the control method therefor of the present invention, a password input is not required when a resume request by a user, such as key input, occurs within a relatively short period of time. Even when the system has entered the suspend mode against a user's will, a task can begin instantaneously, as long as the user reacts in a hurry so that the user experiences minimum irritation. In addition, when the suspend mode continues only for a short time, the probability that a user is absent is very low so that even though the comparison of the password is omitted, there is very little risk that the security of the system will be jeopardized.

When a resume request occurs after a sufficiently long period of time has elapsed since the system entered the suspend mode, a user is requested to input a password. When the suspend mode continues for such a long time, the probability of the user being absent from the PC is relatively high, and thus, the password input is required for maintaining system security. Even if a user is requested to input a password to resume a job, he will experience very little irritation because he has done no key input operation for a long time and has been resting from his work.

In other words, the present invention provides an information processing system and a control method therefor that can respond appropriately to the demands for both system security and system useability (operability) during a power management operation.

Other objects, features and advantages of the present invention will become readily apparent during the following detailed explanation that is given while referring to the accompanying drawings.

DESCRIPTION OF THE PREFERRED EMBODIMENT(S)

A. Hardware arrangement of personal computer (PC) 100

Figure 1:
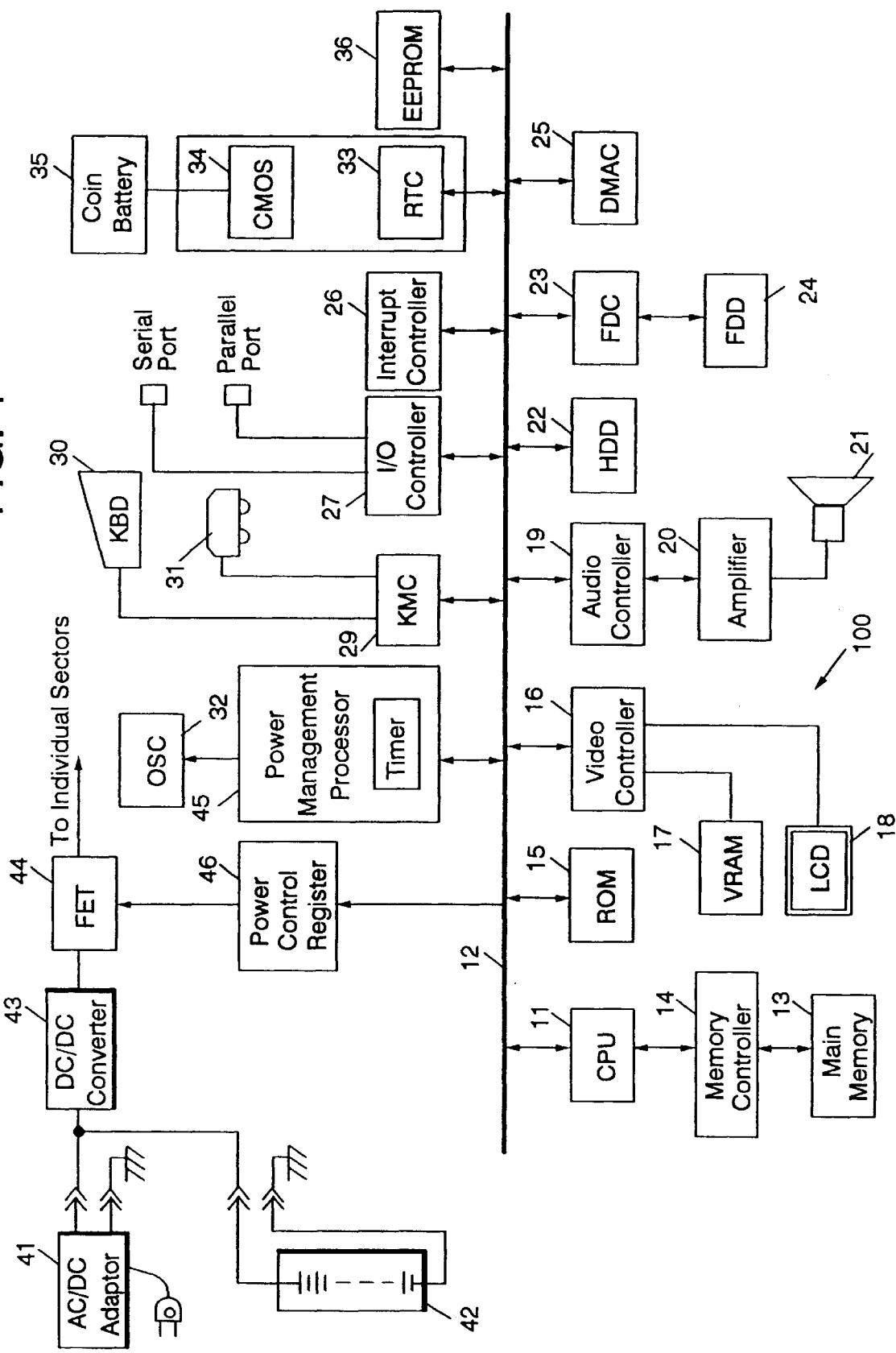
FIG. 1 is a schematic diagram illustrating the hardware arrangement of a personal computer 100 according to the present invention.

FIG. 1 is a diagram illustrating the hardware arrangement of a personal computer (PC) 100, according to one embodiment of the present invention.

In the PC 100, a Central Processing Unit (CPU) 11 that serves as a main controller executes various programs under the control of an operating system (OS). The CPU 11 communicates with the individual sections across a common signal transfer path (also called a "bus") 12 that consists of data signal lines, address signal lines, and control signal lines. The CPU 11 may be an x86 processor (e.g., a "P54C-75 (Pentium)") manufactured by Intel Corp. The bus 12 may be an Industry Standard Architecture (ISA) bus.

A main memory 13 is a volatile random access memory (RAM) that is employed to load the programs (OS and application programs: see division C below) that are executed by the CPU 11, and that serve as a work area for the CPU 11. Dynamic RAM (DRAM), with which the construction of a relatively large memory capacity can be effected at a low price, can be used as the main memory 13. A memory controller 14 controls access to the main memory 13. A ROM 15 is a nonvolatile memory for which written data are determined during the manufacturing process, and is employed to semi-permanently store a coded test program which is performed at the time of activation of the system 100 (POST), and programs for controlling hardware components of the system 100 (BIOS).

A video controller 16, which is a peripheral controller for actually handling a drawing command from the CPU 11, first writes the processed drawing data into a screen buffer (VRAM) 17, and then reads the drawing data from the VRAM 17 and outputs the data to a liquid crystal display device (LCD) 18. An audio controller 19 is a peripheral controller for processing the input/output of an audio signal. An audio signal that is produced by the audio controller 19 is amplified by, for example, an amplifier 20 and the amplified signal is released through a loudspeaker 21.

A hard disk drive (HDD) 22 and a floppy disk drive (FDD) 24 are so-called auxiliary storage devices (direct access storage devices: DASDs). A floppy disk controller (FDC) 23 is a FDD 24 driving controller. A Direct Memory Access (DMA) controller 25 is a peripheral controller for transferring data between the main memory 13 and peripheral devices (e.g., the FDD 24) without the involvement of the CPU 11. An interrupt controller 26 constantly monitors the bus 12. When interrupt controller 26 detects the occurrence of an interrupt, it reports this to the CPU 11 (more specifically, to a BIOS that handles such an interrupt).

An I/O controller 27 is a peripheral controller for controlling the data input/output, which is performed with an external device, such as a modem or a printer, via a serial port or a parallel port. A keyboard/mouse controller (KMC) 29 converts the matrix input via a keyboard (KBD) 30 or the coordinates pointed by a mouse 31, into a format that matches the definition of an operating system, and transmits the converted value to the bus 12.

An oscillator (OSC) 32 transmits a clock signal to a device, such as a power management processor 45 (which will be described later) or the CPU 11, that is synchronously operated or that has a timer function.

A real time clock (RTC) 33 is a device for generating a periodic signal that may be used for measuring the real time. The system 100 has a function for time-stamping the time at the RTC 33 in a predetermined area among the main memory 13. With this function, a period of time between the occurrence of two phenomena (e.g., an interval from a point at which the system 100 enters the suspend mode to a point at which it resumes from the suspend mode) can be calculated. A CMOS RAM 34 is a storage device with a CMOS structure and is employed to temporarily store system configuration data. The RTC 33 and the CMOS RAM 34 in this embodiment are mounted on a single chip, and are backed up by a coin battery 35, so that the RTC 33 can continue counting the real time and the data can be maintained in the CMOS RAM 34 even while the system 100 is powered off.

An Electrically Erasable PROM (EEPROM) 36 is a nonvolatile semiconductor memory into which overwriting of data is possible, and is employed to store necessary data for the security of secret information concerning the system 100 (e.g., a password, the serial number of an installed PC card, part of the system configuration data). The secret information can also be stored in the CMOS RAM 34. It should be noted that, since data (e.g., a password) stored in the CMOS RAM 34 is erased by removing the coil battery 35, the storing of data in the EEPROM 36 provides greater security.

The system 100 is driven by the power supply from an external commercially available power source, which is obtained via an AC/DC adaptor 41, or from an incorporated battery pack 42. The output voltages of the power sources 41 and 42 are sent in parallel to a DC/DC converter 43. The DC/DC converter 43 drops these voltages to levels (e.g., 5 V and 3.3 V) that are appropriate for driving the system 100, and outputs a constant power voltage. The start and stop of the power supply is performed by the closing and the opening of an FET switch 44. The gate terminal of the FET switch 44 is electrically connected to a corresponding bit cell in a power control register 46.

The power management processor 45 is a peripheral controller that is provided mainly to manage the power supply to the individual sections in the system 100, and is preferably one chip controller IC "330/H8" that is manufactured by Hitachi Ltd. This IC includes a 16-bit CPU, a RAM, a ROM, a timer, eight analog input pins and 16 digital input/output pins and its functions are programmable. The power management processor 45 in this embodiment communicates with the individual sections via the bus 12, so that it can monitor the user input operation occurring at the keyboard 30 or the mouse 31. The processor 45 also can detect the operating conditions of the system 100 and the open/closed state of the cover (the LCD), and can rewrite the contents of the bit cells in the power control register 46 (see division B below). The power management processor 45 also has the functions of power management timers, such as an LCD-off timer and a suspend timer. Each time the determined time for each power management timer has elapsed following a last user access (or each time the low activity state of the system 100 continues for a determined time or longer), or when the cover is closed, an interrupt is generated across the bus 12.

Almost all the PCs that are currently sold have the equivalent of the block of hardware components 11 through 36. Although many hardware components other than those shown in FIG. 1 are required to constitute a PC, this is obvious to one having ordinary skill in the art, and to simplify the description, no explanation for them will be given in this specification.

B. Power supply system for personal computer (PC) 100

Figure 2:
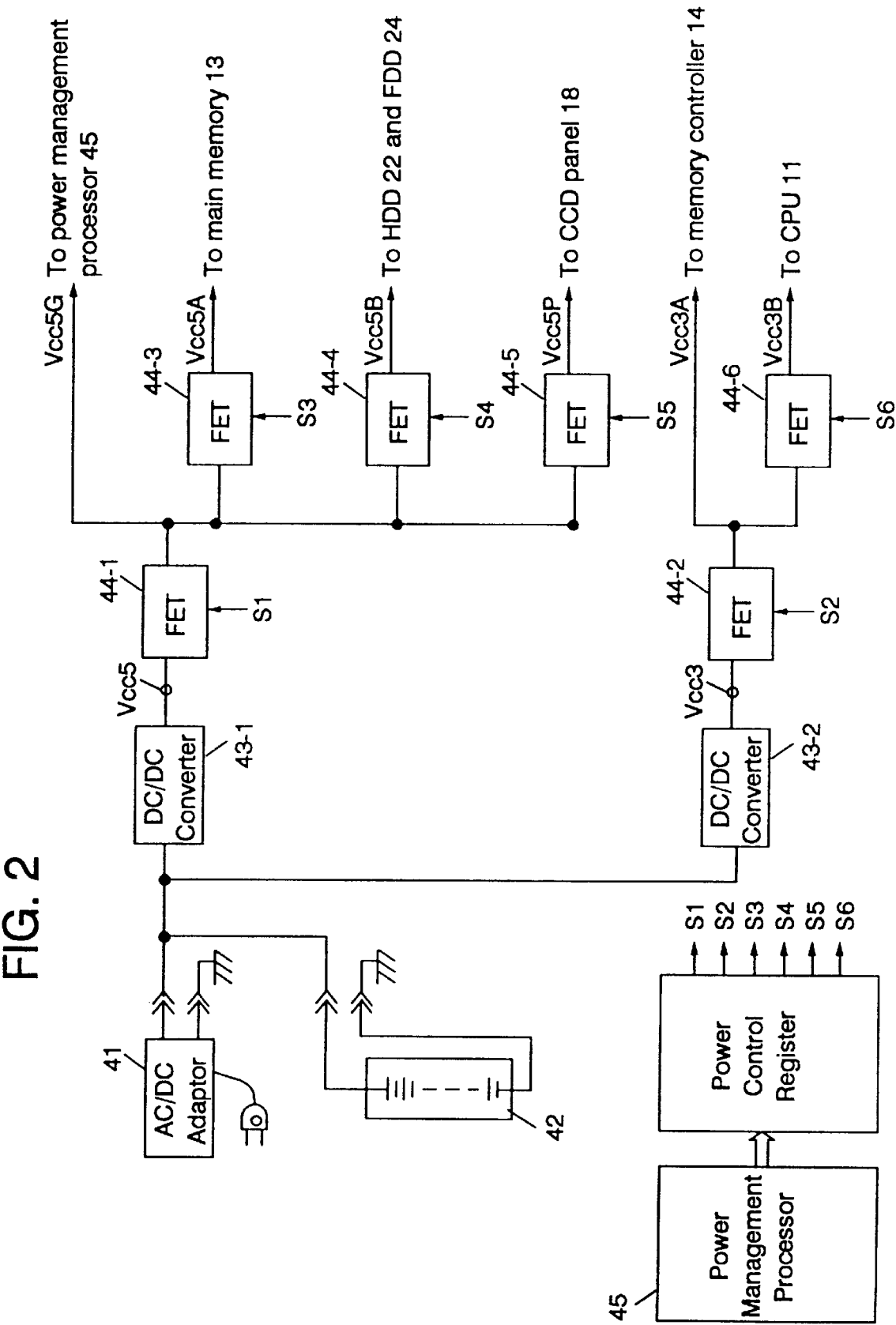
FIG. 2 is a detailed diagram illustrating the power supply system of the computer 100.

FIG. 2 is a detailed diagram showing a power supply system for the PC 100 according to the present invention.

The DC/DC converter 43, which is shown as a single block 43 in FIG. 1 and which supplies power to components that require different drive voltages, is actually comprised of two blocks: a DC/DC converter 43-1 for supplying a voltage of 5 V and a DC/DC converter 43-2 for supplying a voltage of 3.3 V. In correspondence with the DC/DC converters 43-1 and 43-2, the FET switch 44 in FIG. 1 that is employed to halt the power supply is actually constituted by six FET switches 44-1 through 44-6.

A power feed line $V_{cc5}$ that extends from the DC/DC converter 43-1 is branched via the FET switch 44-1 to provide four sub-power feed lines $V_{cc5G}$, $V_{cc5A}$, $V_{cc5B}$ and $V_{cc5P}$. The sub-power feed line $V_{cc5G}$ is connected to the power management processor 45, etc.; the $V_{cc5A}$ is connected to the main memory 13; the $V_{cc5B}$ is connected to the DASD, such as the HDD 22 and the FDD 24; and the $V_{cc5P}$ is connected to the LCD panel 18. The FET switches 44-3, 44-4, and 44-5 are inserted between the sub-power feed lines $V_{cc5A}$, $V_{cc5B}$, and $V_{cc5P}$ and the supplied power destinations in order to halt the power supply.

A power feed line $V_{cc3}$ that extends from the DC/DC converter 43-2 is branched via the FET switch 44-2 to provide two sub-power feed lines $V_{cc3A}$ and $V_{cc3B}$. The sub-power feed line $V_{cc3A}$ is connected to the memory controller 14 and the $V_{cc3B}$ is connected to the CPU 11, etc. The FET switch 44-6 is inserted between the sub-power feed line $V_{cc3B}$ and the supplied power destination in order to halt the power supply.

The gate terminals of the six FET switches 44-1 through 44-6 are electrically connected to the corresponding bit cells in the power control register 46. The power management processor 45 can access the bit cells of the power control register 46 via the bus 12, and can set or reset these bit cells to control the power supply to the system 100 for each sub-power feed line.

By referring to the above explanation, it would be easily understood that the personal computer that has the power supply system as is shown in FIG. 2 can perform power management operations, such as an LCD-off and a suspend operation. For example, for the LCD-off operation, the FET switch 44-5 may be rendered inactive, and for the suspend operation, the FET switches, other than the switches 44-1 and 44-3, may be rendered inactive.

The technique that relates to the power management processor 45 and the power control register 46 is well known. A hardware block that is the equivalent of the power management processor 45 and the power control register 46 is described in, for example, the specifications for Japanese Patent Application No. Hei 04-54955 (Japanese Unexamined Patent Publication No. Hei 05-28978: our company reference No. JA9-92-004) and for Japanese Patent Application No. Hei 05-184186 (Japanese Unexamined Patent Publication No. Hei 07-84848: our company reference No. JA9-93-020). In addition, IBM ThinkPads 700/750/755 that are sold by IBM include hardware components that are the equivalent of the components 45 and 46.

C. Software arrangement of personal computer (PC) 100

Figure 3:
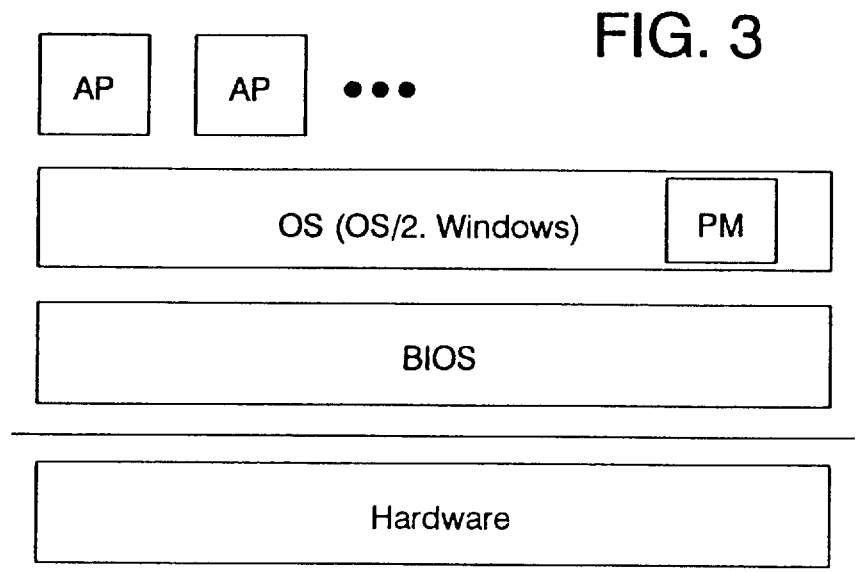
FIG. 3 is a schematic diagram illustrating the hierarchical software system that can be employed by the computer 100 according to the present invention.

FIG. 3 is a schematic diagram illustrating the hierarchial software arrangement that can be employed by the PC 100 according to the present invention.

The software in the lowest layer is a Basic Input/Output System (BIOS). The BIOS is a program group which includes a collection of basic commands for controlling the hardware components, such as the video controller 16, the keyboard 30, the HDD 22 and the FDD 24, in the system 100 and is coded and stored in the ROM 15. The BIOS also has a function for handling interrupts generated on the bus 12.

An operating system (OS) is basic software for the total management of the hardware and the software of the system 100, and provides hardware resource management functions, such as file management, memory management, task management and data input/output management, and a user interface (a system command and a system call) for handling a screen display and the manipulation of a mouse. OS/2 (a trademark of IBM Corp.) and Windows (a trademark of Microsoft Corp.), for example, correspond to the operating system. The operating system in this embodiment includes, as one module, a power management (PM) program for executing a power management operation (see division D below).

In the topmost layer are application programs (APs). Word processing software, database software, software for calculation for tables, and communication software correspond to these application programs. The application programs are loaded as needed from the DASDs, such as the HDD 22 and the FDD 24, into the main memory 13 as desired by a user.

D. Suspend/resume operation of personal computer (PC) 100

The hardware and software arrangements of the computer system 100 that embodies the present invention have been explained above. The processing routine of the present invention will now be explained together with the suspend/resume operation of the system 100.

D-1. Suspend/resume routine

Figure 4:
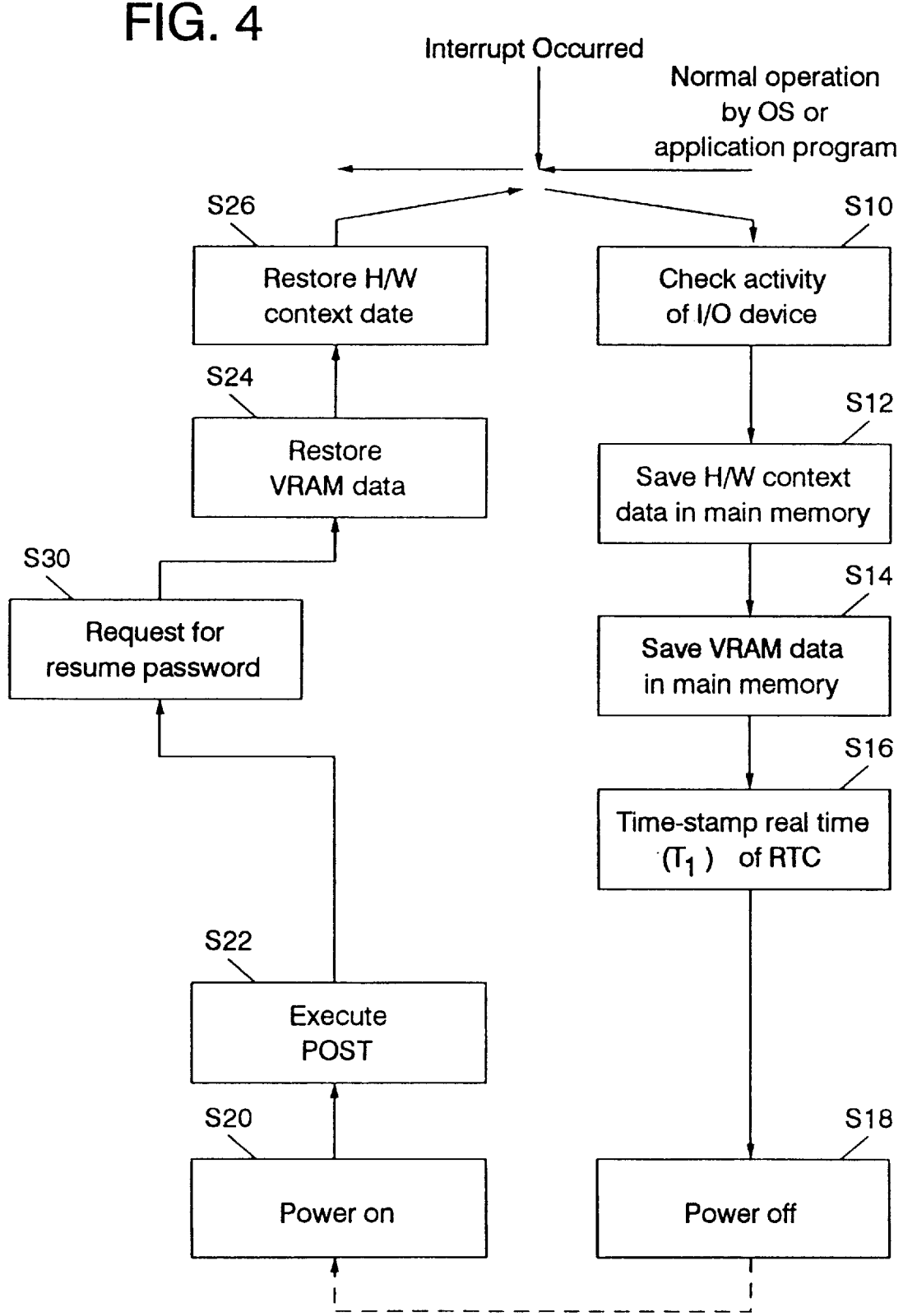
FIG. 4 is a flowchart showing a routine for shifting a mode to a suspend mode and a routine (resume routine) for returning from the suspend mode and resuming a task.

FIG. 4 is a flowchart showing a routine (suspend routine) for entering a suspend mode and a routine (resume routine) for recovering from the suspend mode and restarting a task.

(1) Suspend routine

The power management processor 45, during the normal operation of the OS or the execution of application programs, monitors the user input at the keyboard 30 or by means of the mouse 31, the operating state of the system 100, and the open/close state of the cover (LCD). When an internal suspend timer detects that a predetermined time $T_{SUS}$ has elapsed since a last user input or that the inactive state of the system 100 has continued more than the predetermined time $T_{SUS}$, the power management processor 45 generates an interrupt request on the bus 12 (see division A above). When the cover is closed, the power management processor 45 also generates an interrupt request on the bus 12. The interrupt controller 26 detects this interrupt request and reports it to the BIOS. The BIOS searches for the source that generated the interrupt request and determines that it originated at the power management processor 45. With the result as a trigger, the right to control the system 100 is transferred to the PM program and the suspend routine is begun.

In the suspend routine, first, a check is performed to determine whether or not there is any I/O device activity (step S10). When such activity exists (e.g., a DMA transfer is being performed), the check for the presence of I/O activity is again performed after a certain period (e.g., 10 msec) has elapsed. Program control goes on standby until no I/O device activity is detected.

When no I/O device activity is detected, the PM program saves hardware context data in the main memory 13 (step S12). Then, VRAM original data are saved in the main memory 13 (step S14). Specific examples of hardware context data are the register values of individual chips, such as the CPU 11, the interrupt controller 26, the DMA controller 25, the video controller 16 and the count values for the timers. The hardware context data and the VRAM data are required in order for a task to be resumed at the same point at which it is halted.

Consecutively, the PM program time-stamps real time ($T_1$) of the RTC 33, at a point at which the system 100 enters the suspend mode into a predetermined area of the main memory 13 (step S16). It is convenient, when the following resume routine is performed, to write in a predetermined area of the main memory 13 a symbol (called a "suspend signature") indicating that the system 100 is powered off after the above described suspend routine is performed. The suspend signature consists, for example, of about 2 bytes of data.

When the storing of necessary data and time stamping are completed, the PM program requests the power management processor 45 to halt the power supply across specific power feed lines (sub-power feed lines other than $V_{cc5A}$). Upon the receipt of this request, the power management processor 45 alters the contents of the bit cells in the power control register 46. In this manner, the power supply to all the electric circuits, except for the main memory 13, is halted, and the system 100 thereafter enters a suspend mode (step S18).

(2) Resume routine

The power management processor 45 is activated periodically during the suspend mode, and makes an examination to determine whether any user input (or a resume request) has been effected by means of the keyboard 30 or with the mouse 31. When such user input is detected, at step S18 the power supply across the power feed lines that were inactive is restarted (step S20). Then, the CPU 11 executes the POST program in the ROM 15 (step S22). According to the POST, after the self-diagnosis of each hardware component is completed, a check is performed to determine whether the system 100 executes either a normal power-on operation (POR) or a resume operation. This determination is made by determining, for example, whether or not a suspend signature is set in a predetermined area of the main memory 13. When it is determined to be a resume operation, the right to control the system 100 is transferred to the PM program, and thus the resume routine is begun.

In the resume routine, first, the procedure at step 30 is performed to prompt a user to input a password (a resume password). The actual request for a resume password greatly influences the useability and the security of the system 100 (as previously described). (A detailed explanation for step S30 will be given in division D-2.) The PM program restores the original VRAM data and the hardware context data, which had been saved in the main memory 13, to their original locations (steps S24 and S26).

The system 100, when the stored data are completely restored, becomes almost the same state as the previous state at which the interrupt request was generated. Then the system 100 can restart the OS or a task for an application program at the point where it was halted.

D-2. Resume Password

Figure 5:
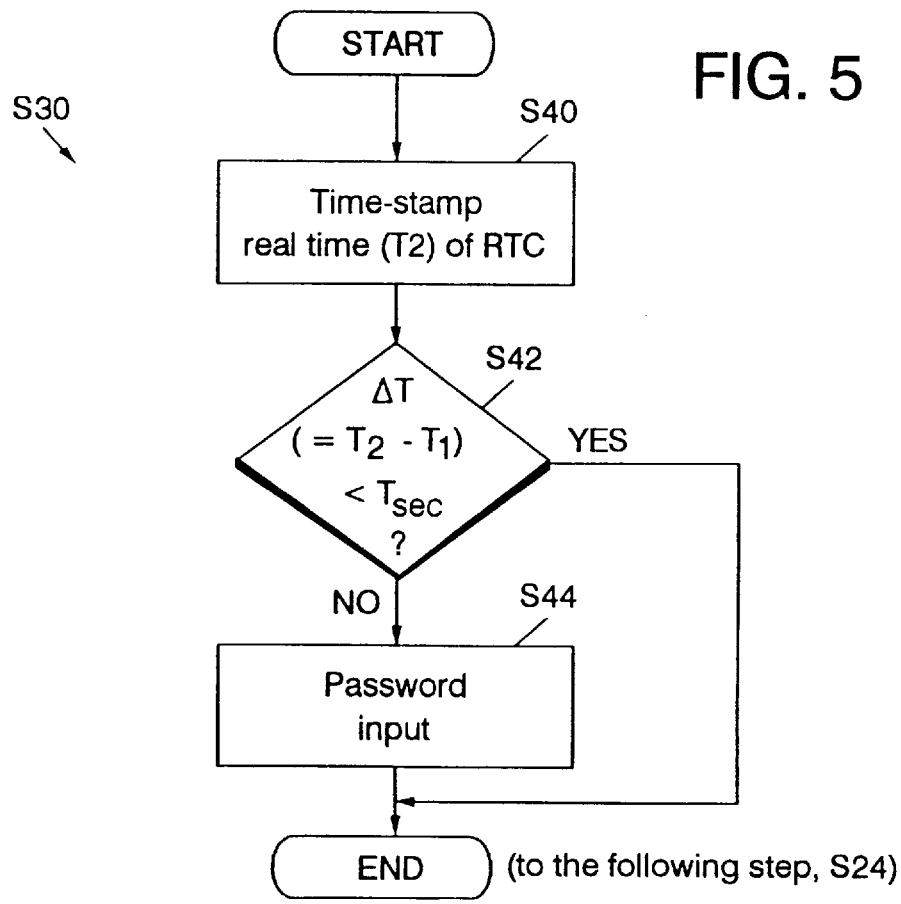
FIG. 5 is a detailed flowchart of the procedure at step S30 in the flowchart in FIG. 4 for requesting a resume password.

FIG. 5 is a detailed flowchart of the procedure at step S30 in FIG. 4 for requesting a resume password.

At step S40, a real time ($T_2$) of the RTC 33, at a point at which the system resumes from the suspend mode, is time-stamped.

Then, time $\Delta T(T_2-T_1)$, during which the system 100 was in the suspend mode is calculated and is compared with security time $T_{sec}$ (step S42). The security time $T_{sec}$ is a threshold value for determining whether or not the input of a password should be requested, and 10 minutes is an optimal time according to the empirical rule. The security time may be a default value or a user programmable value, and is stored in, for example, the CMOS RAM 34.

When the suspend time $\Delta T$ is longer than the security time, a password input is actually requested to maintain the security of the system 100 (step S44). Since a user probably has been absent from the PC during the suspend mode, a resume password is a requisite for security maintenance. In that case a password input operation may not irritate a user because he has stopped working and has rested for a long time. When the inputted password does not match the registered password, the password input may be prompted again. Further, when the password input process has been repeated and has failed a predetermined number of times (e.g., three times), further password input may not be permitted and recovery to the resume mode may be inhibited.

When the suspend time $\Delta T$ is shorter than the security time, in order not to adversely affect useability, program control skips step S44, so that a password input is not prompted. Then the program control advances directly to step S24 for restoring the data. When the transition to the suspend mode occurs suddenly against a user's will, the user tends to react quickly and to request to immediately resume the task (i.e., $\Delta T$ is shortened). According to such empirical rule, the procedure at step S44 is skipped, and as a result, the resume operation can be completed within a relatively short time (about 5 seconds). Further, since it is less probable that a user has been absent during the short suspend mode, the security of the system 100 is not jeopardized even if a request for a resume password is omitted.

Through the above description, it should be understood that the present invention provides an optimal suspend/resume operation while maintaining a balance between useability and security.

The present invention has been described in detail while referring to a specific embodiment. However, it should be obvious to one having ordinary skill in the art that various modifications or revisions of the embodiment are possible within the scope of the present invention. The present invention can be employed to perform power management operations, such as a suspend operation, for information processing systems that have hardware arrangements that differ from that in FIGS. 1 and 2. That is, although the present invention has been disclosed by using an example, it should not be limited to that example. To fully understand the subject of the present invention, the claims should be referred to.

As is described in detail, according to the present invention it is possible to provide an information processing system that has a power saving function (also called a power management function) for reducing, as needed, power to be supplied to electric circuits that have gone into a low activity state, or for halting the power supply to them, and to a control method therefor.

According to the information processing system and the control method therefor of the present invention, a password (resume password) input is not required when the reaction of a user, such as key input, occurs within a relatively short period of time after entering the suspend mode. Since a task can be restarted instantaneously even when the system has entered the suspend mode against a user's will, the user experiences minimum irritation. In addition, when the suspend mode continues only for a short time, the probability that a user is absent is very low, so that, even though a password input is omitted, there is very little risk that the security of the system will be jeopardized.

When a resume request, such as a key input, occurs after a sufficiently long period of time has elapsed since the system enters a power management mode, such as the suspend mode, a user is to be requested to input a password. When the suspend mode (or the standby state) continues for a long time, the probability of a user being absent is relatively high, and thus, a password input is requisite to the maintenance of the security of the system. Even if a user is requested to input a password to resume a job, the user will experience no irritation because he has performed no key input for a long time and has been resting from his work.

In other words, according to the present invention, it is possible to provide an information processing system that can respond appropriately to the demands for both system security and for system useability (operability) during a power management operation, and a control method therefor.

What is claimed is:

1. An information processing system capable of operating in at least two modes of power management, a normal mode and a suspend mode comprising:

a processor coupled to a bus and capable of executing an operating system, said operating system being capable of calling a power management routine, a volatile memory in circuit communication with said processor for storing memory data, a user input device coupled to said bus, power management circuitry in circuit communication with said processor for initiating a change in the mode of said system between said normal operating mode and said suspend mode responsive to a preselected suspend event, said power management circuitry including an inactivity suspend timer set to expire after a first predetermined period of time and wherein a preselected suspend event includes the expiration of said inactivity suspend timer, and said power management routine being operative after said information processing system has entered said suspend mode to (1) measure the elapsed time between entering said suspend mode and a next user input and either (2) prompt a user to enter a password when the elapsed time after entry into said suspend mode is longer than a second predetermined period of time or (3) resume said normal mode in response to said next user input when the elapsed time after entry into said suspend mode is less than the second predetermined period of time.

2. The information processing system of claim 1, wherein said first predetermined period of time is an inactivity time interval which has elapsed since a last user input or a last processing operation.

3. The information processing system of claim 1, wherein said power management routine includes:

a suspend routine which is performed in response to said suspend event for changing said system from said normal mode to said suspend mode, said suspend routine saving a real time of when said system entered said suspend mode, and a resume routine which is performed while said information processing system is in said suspend mode in response to said next user input for changing said system from said suspend mode to said normal mode, said resume routine being operative to (1) measure the elapsed time between entering said suspend mode and said next user input and either (2) prompt a user to enter a password when the elapsed time after entry into said suspend mode is longer than a second predetermined period of time or (3) resume said normal mode in response to said next user input when the elapsed time after entry into said suspend mode is less than the second predetermined period of time.

4. The information processing system of claim 1, wherein said second predetermined period of time is a fixed value.

5. The information processing system of claim 1, wherein said second predetermined period of time is a user programmable value.

6. A control method for information processing system of the type which is capable of operating in at least two modes of power management, a normal mode and a suspend mode, said method comprising the steps of:

initiating a suspend mode when a first predetermined time has elapsed since a last user input or a last processing operation, measuring a second elapsed time period between the start of the suspend mode and the next user input, determining whether to prompt a user to enter a password by comparing the second elapsed time period with a second predetermined time, prompting a user to input said password only if the second elapsed time period is longer than the second predetermined time, and resuming to a normal mode in response to said next user input if the second elapsed time period is less than the second predetermined time.

7. The method of claim 6, wherein said resuming step is performed only if the password matches a predetermined password.

* * * * *